(12) United States Patent
Weigl et al.

(10) Patent No.: US 9,944,175 B2
(45) Date of Patent: Apr. 17, 2018

(54) FUEL TANK SYSTEM

(71) Applicant: CONTINENTAL AUTOMOTIVE GMBH, Hannover (DE)

(72) Inventors: Manfred Weigl, Sinzing (DE); Philippe Grass, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 91 days.

(21) Appl. No.: 14/892,836

(22) PCT Filed: Apr. 23, 2014

(86) PCT No.: PCT/EP2014/058235
§ 371 (c)(1),
(2) Date: Nov. 20, 2015

(87) PCT Pub. No.: WO2014/187639
PCT Pub. Date: Nov. 27, 2014

(65) Prior Publication Data
US 2016/0167510 A1    Jun. 16, 2016

(30) Foreign Application Priority Data
May 24, 2013  (DE) .................. 10 2013 209 716

(51) Int. Cl.
*G01M 3/32* (2006.01)
*F02M 25/08* (2006.01)
(Continued)

(52) U.S. Cl.
CPC ...... *B60K 15/077* (2013.01); *B60K 15/03006* (2013.01); *F02M 25/089* (2013.01);
(Continued)

(58) Field of Classification Search
CPC ............ B60K 15/03006; B60K 15/077; B60K 2015/03026; F02D 29/02; F02M 25/0818;
(Continued)

(56) References Cited

U.S. PATENT DOCUMENTS

| | | |
|---|---|---|
| 5,794,599 A | 8/1998 | Blumenstock |
| 6,105,557 A | 8/2000 | Schnaibel et al. |

(Continued)

FOREIGN PATENT DOCUMENTS

| | | |
|---|---|---|
| DE | 197 08 329 A1 | 9/1997 |
| DE | 198 34 332 A1 | 2/2000 |

(Continued)

*Primary Examiner* — Randy Gibson
*Assistant Examiner* — Gedeon M Kidanu
(74) *Attorney, Agent, or Firm* — Cozen O'Connor

(57) ABSTRACT

A fuel tank system has a fuel tank and a storage element. In monitoring the fuel tank system, to check the sealing action of the fuel tank system at regular intervals during driving of the motor vehicle, a first valve is arranged in the first line upstream of the storage element as viewed in the direction of the fresh-air flow, an air pump is arranged between the first valve and the storage element, and a second valve is arranged in the second line between the storage element and the intake line. A mass flow sensor is arranged in the first line between the first valve and the storage element.

7 Claims, 2 Drawing Sheets

(51) Int. Cl.
*F02D 29/02* (2006.01)
*B60K 15/077* (2006.01)
*B60K 15/03* (2006.01)

(52) U.S. Cl.
CPC .... *F02M 25/0818* (2013.01); *F02M 25/0836* (2013.01); *F02M 25/0854* (2013.01); *F02M 25/0872* (2013.01); *G01M 3/3209* (2013.01); *B60K 2015/03026* (2013.01); *F02D 29/02* (2013.01)

(58) Field of Classification Search
CPC ........... F02M 25/0836; F02M 25/0854; F02M 25/0872; F02M 25/089; G01M 3/3209
See application file for complete search history.

(56) References Cited

U.S. PATENT DOCUMENTS

| | | | |
|---|---|---|---|
| 6,202,478 | B1 | 3/2001 | Blomquist et al. |
| 6,283,097 | B1* | 9/2001 | Cook ................. F02M 25/0818 123/198 D |
| 8,573,187 | B2* | 11/2013 | Knittel ............... F02D 41/0045 123/518 |
| 2004/0186638 | A1* | 9/2004 | Lederle .............. F02M 25/0809 73/40 |
| 2004/0226821 | A1* | 11/2004 | Schasfoort ........... F04B 19/006 204/600 |
| 2005/0022594 | A1* | 2/2005 | Padmanabhan ......... G01F 1/684 73/204.26 |
| 2005/0229688 | A1* | 10/2005 | Miyahara ............... F02M 25/08 73/114.41 |
| 2010/0186482 | A1* | 7/2010 | Bierl ................... F02D 41/0045 73/24.06 |
| 2011/0226804 | A1* | 9/2011 | Bierl ..................... F02D 41/004 222/1 |
| 2012/0128478 | A1* | 5/2012 | Pedersen ............. F04D 15/0088 415/208.1 |
| 2013/0297177 | A1* | 11/2013 | Kim ................... F02M 25/0809 701/102 |

FOREIGN PATENT DOCUMENTS

| | | |
|---|---|---|
| DE | 198 34 332 B4 | 6/2005 |
| DE | 2010 031 216 | 3/2011 |
| DE | 10 2010 054 668 | 6/2012 |
| WO | WO 2012/03307 A2 | 3/2012 |

* cited by examiner

FUEL TANK SYSTEM

CROSS-REFERENCE TO RELATED APPLICATIONS

This is a U.S. national stage of application No. PCT/EP2014/058235, filed on 23 Apr. 2014, which claims priority to the German Application No. DE 10 2013 209 716.6 filed 24 May 2013, the content of both incorporated herein by reference.

BACKGROUND OF THE INVENTION

1. Field of the Invention

The invention relates to a fuel tank system with a fuel tank and a storage element, and to a method for monitoring a fuel tank system.

2. Related Art

Numerous measures have been introduced in recent decades for reducing the pollutant emissions of motor vehicles. One such measure consists in using a fuel tank system in which a fuel tank is connected to a storage element for the temporary storage of hydrocarbons. During the refueling of motor vehicles, hydrocarbons are outgassed from the fuel, and it is sought to prevent the hydrocarbons from passing into the atmosphere. Also, in the presence of high temperatures or when driving over uneven surfaces, increased outgassing of hydrocarbons from the fuel occurs, wherein it must be ensured, in an effective manner, that the hydrocarbons do not escape into the atmosphere. In particular, in the case of hybrid vehicles, in which the internal combustion engine is entirely shut down over long travelling distances, it is necessary for outgassed hydrocarbons to be temporarily stored in an effective manner in order to be burnt at a later point in time upon a restart of the internal combustion engine. For this purpose, fuel tank systems that consist of a fuel tank and a storage element for the temporary storage of hydrocarbons have become established, wherein the fuel tank and the storage element are connected to each other in such a manner that the hydrocarbons outgassed from a fuel situated in the fuel tank are stored in the storage element, wherein the storage element is connected to a first line through which fresh air can be delivered to the storage element, and the storage element is connected to a second line which connects the storage element to an intake line and through which fresh air enriched with hydrocarbons can be delivered from the storage element to the intake line. In this manner, the storage element can be cyclically purged with fresh air, and the stored hydrocarbons can be supplied to an intake line that connects the internal combustion engine to the air filter and supplies air for combustion to the internal combustion engine. It is thus possible for the hydrocarbons outgassed from the fuel tank to be burnt in the internal combustion engine, and an escape of the hydrocarbons into the atmosphere is reliably prevented. An example of a fuel tank system according to the prior art is found in the PCT application with the application number PCT/KR2011/006516. In order to ensure error-free operation of the fuel tank system, the sealing action of the entire fuel tank system has to be checked at regular intervals. This check of the sealing action cannot be limited to garage visits of the motor vehicle but rather the check of the sealing action has to be undertaken in the vehicle, i.e., onboard, throughout the driving operation of the motor vehicle.

SUMMARY OF THE INVENTION

It is therefore an object of the present invention to specify a cost-effective fuel tank system configured such that the sealing action thereof can be checked at regular intervals during the driving operation of the motor vehicle.

The object is achieved by a fuel tank system and by the method according to the invention.

Owing to the fact that a first valve is firstly arranged in the first line upstream of the storage element in the direction of the fresh-air flow and an air pump is then arranged between the first valve and the storage element, and a second valve is arranged in the second line between the storage element and the intake line, wherein a mass flow sensor is arranged in the first line between the first valve and the storage element, after the second valve in the fuel tank system is closed the air pump can be used to generate a positive pressure in relation to the atmospheric pressure, which, by the subsequent closing of the first valve, can drop only if a leakage is present in the fuel tank system. When the first valve is opened after a predetermined waiting time, with the second valve continuing to remain closed, the air pump would deliver fresh air into the fuel tank system if, during the waiting time, a pressure drop has occurred in the fuel tank system because of a leakage. This delivery of the fresh air can be detected by the mass flow sensor, and therefore the presence of a leakage in the fuel tank system can be reliably determined. Thus, it is possible in this manner to determine a leakage in the fuel tank system without a pressure sensor having to be arranged in the fuel tank system. The sealing action of the fuel tank system can be checked solely by the air pump and the mass flow sensor when the air pump, the mass flow sensor, the first valve and the second valve are arranged in accordance with the invention. The dispensing with a pressure sensor in the fuel tank system makes the fuel tank system be more cost-effective, have a longer service life and be more reliable.

According to an aspect of the invention, the air pump is in the form of a radial pump. A radial pump has an easily reproducible relationship between the pressure that the radial pump generates and the rotational speed at which the radial pump is driven, or the power that the radial pump consumes, if the physical parameters, for example the temperature, of the delivered air are known. The positive pressure generated in the fuel tank system can therefore be readily controlled by the control unit with reference to the power consumption of the radial pump.

In a refinement of the invention, the mass flow sensor is in the form of a sensor that operates on the basis of the thermal (i.e., calorimetric) principle.

Mass flow sensors of this type are robust and durable components, which can furthermore be produced in highly economical fashion in high unit quantities. It is advantageous if the mass flow sensor is integrated in the housing of the air pump.

According to an aspect of the invention, a temperature sensor is arranged in the first line. The temperature is an important physical parameter that may be of importance in determining the mass flow sucked up and can therefore supply a control unit with important information for assessing the sealing action of the fuel tank system. This applies in an analogous manner if an air humidity sensor is arranged in the first line.

In the method according to the invention for monitoring a fuel tank system, the second valve is firstly closed, a positive pressure relative to the ambient pressure of the fuel tank system is then generated in the fuel tank system by the air pump, whereupon the first valve is closed and whereupon the change in the positive pressure over time in the fuel tank system is observed, wherein the sealing action of the fuel tank system is monitored with reference to the change in the positive pressure in the fuel tank system. By closing the first and the second valve, the fuel tank system is decoupled from the surrounding atmosphere, and the change in the positive pressure can be observed over a predetermined period of time. By observing the positive pressure over a longer period of time, it is possible to reliably identify even very small leakages, wherein a pressure sensor is not required in order to observe the change in the positive pressure.

The change in the positive pressure in the fuel tank system can advantageously be observed with reference to the power consumption of the air pump. If, after a predetermined period of time, the first valve is opened again and a loss of pressure has occurred via a small leakage within the predetermined period of time, the air pump then has to redeliver a corresponding quantity of air, which is made clearly perceptible by the power consumption of the air pump. The power consumption of the air pump is controlled by the control device.

According to an aspect, the change in the positive pressure in the fuel tank system is observed with reference to the air mass flow in the first line, the air mass flow being determined with the mass flow sensor. If a pressure loss has occurred in the fuel tank system within the predetermined period of time in which the first valve and the second valve were closed, air is redelivered into the fuel tank system by the air pump when the first valve is opened. This redelivered air generates an air mass flow of a sufficient magnitude to be identified by the mass flow sensor.

BRIEF DESCRIPTION OF THE DRAWINGS

An advantageous embodiment of the invention will be described with reference to the figures, in which.

DETAILED DESCRIPTION OF THE PRESENTLY PREFERRED EMBODIMENTS

Figure 1:
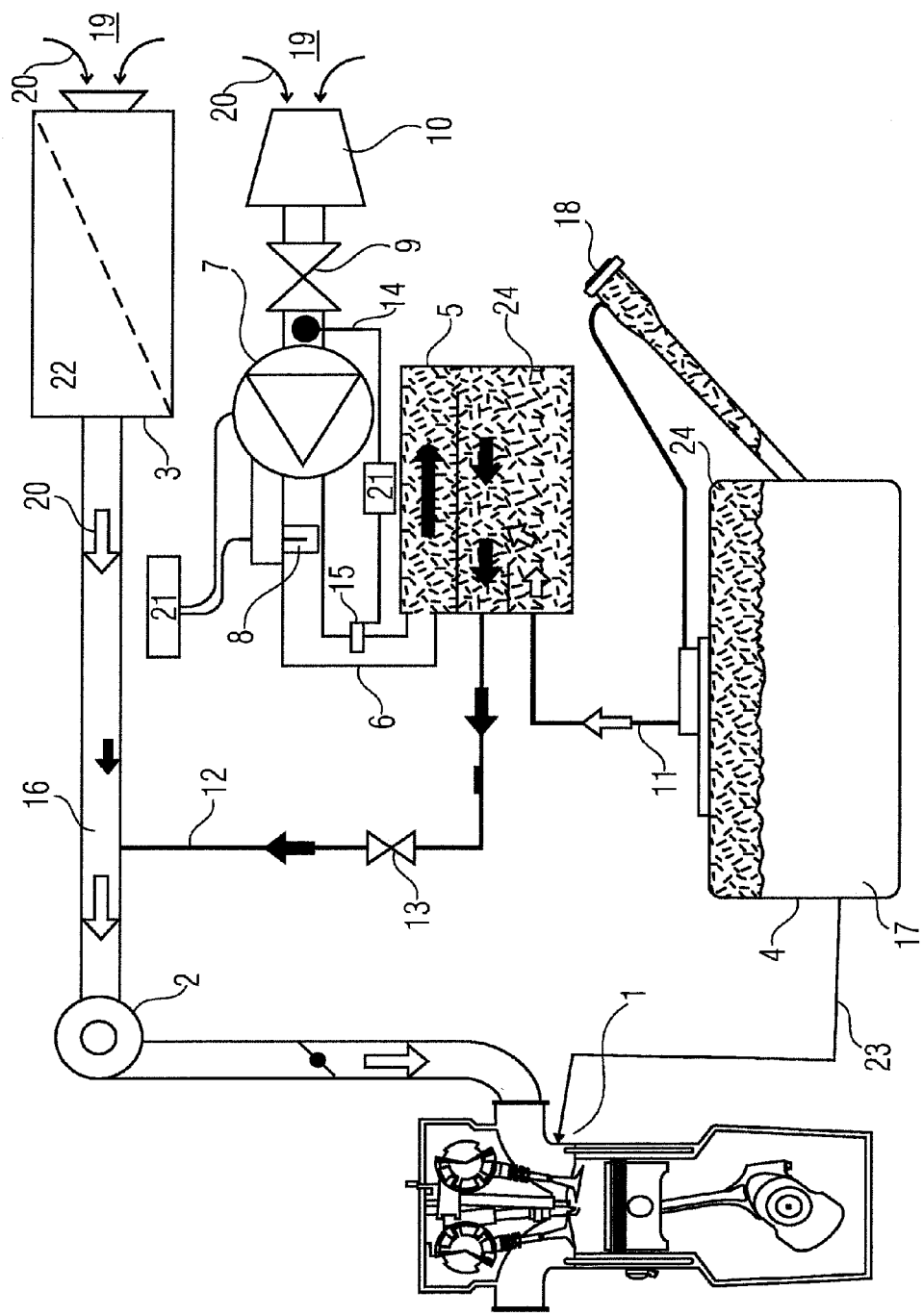
FIG. 1 shows an internal combustion engine having a fuel tank system according to the invention.

FIG. 1 shows an internal combustion engine 1. The internal combustion engine 1 is supplied with fresh air 20 via an intake line 16. Proceeding from the fresh-air side 19, fresh air 20 is conducted into the intake line 16 via an air filter 22, and is possibly compressed by an exhaust-gas turbocharger 2 or a supercharger, and is then supplied to the combustion chambers of the internal combustion engine 1. Furthermore, fuel 17 is supplied to the internal combustion engine 1 from the fuel tank 4 via a fuel line 23. FIG. 1 furthermore shows the fuel tank system with a fuel tank 4 and a storage element 5 for the temporary storage of hydrocarbons 24. The fuel tank 4 and the storage element 5 are connected to each other such that the hydrocarbons 24 outgassed from a fuel 17 situated in the fuel tank 4 can be stored in the storage element 5. The storage element 5 can be, for example, an activated carbon store. An activated carbon store is a closed canister in which carbon is arranged such that hydrocarbons 24 that are to be stored accumulate on the carbon. However, the storage element 5 has a limited storage capacity, and therefore the storage element 5 has to be regularly evacuated by fresh air 20 being drawn in, for example via a dust filter 10, and being forced into the storage element 5 via a first line 6 with the aid of an air pump 7. The fresh air 20 flows through the activated carbon in the storage element 5 and, in the process, absorbs hydrocarbons 24, after which the fresh air 20 enriched with the hydrocarbons 24 is delivered along a second line 12 to the intake air line 16. In the intake air line 16, the fresh air 20 enriched with the hydrocarbons 24 mixes with the fresh air 20 that is drawn in via the air filter 22. It is thus possible for the hydrocarbons 24 to be supplied to the internal combustion engine 1, where the hydrocarbons 24 are burnt in the combustion chambers. Since the fuel tank system contains highly volatile hydrocarbons 24, the sealing action of the fuel tank system has to be checked at regular intervals.

According to the invention, the fuel tank system illustrated in FIG. 1 has, for checking the sealing action, a first valve 9 arranged in the first line 6 upstream of the storage element 5 in the direction of the fresh-air flow. An air pump 7 is arranged between the first valve 9 and the storage element 5, and a second valve 13 is arranged in a second line 12 between the storage element 5 and the intake line 16. Furthermore, a temperature sensor 14, which detects the temperature of the fresh air 20 delivered by the air pump 7, can be arranged in the first line 6. Furthermore, a mass flow sensor 8 is arranged in the first line 6, preferably in the housing of the air pump 7. The mass flow sensor 8 may, for example, operate thermally on the basis of the thermal (i.e., calorimetric) principle. An example of a mass flow sensor 8 which operates on the basis of the thermal (calorimetric) principle is a hot-wire anemometer. Within the mass flow sensor 8 there is situated at least two wires, for example platinum wires, or film resistors, which are heated by electric current. One wire or resistor is cooled directly by the air flowing past, and the other is situated in a position shielded from the flowing air.

The flow of electrical current causes both resistor elements to be heated, wherein the air flowing past cools the non-shielded heating element more intensely than the one shielded from the air. The heating element therefore heats up to a greater degree, and the resistance thereof thus increases. From the resistance values of the two heating elements, and the difference thereof, it is possible, by a characteristic map, to derive the mass flow of the fresh air in the first line and the presence of hydrocarbons.

Figure 2:
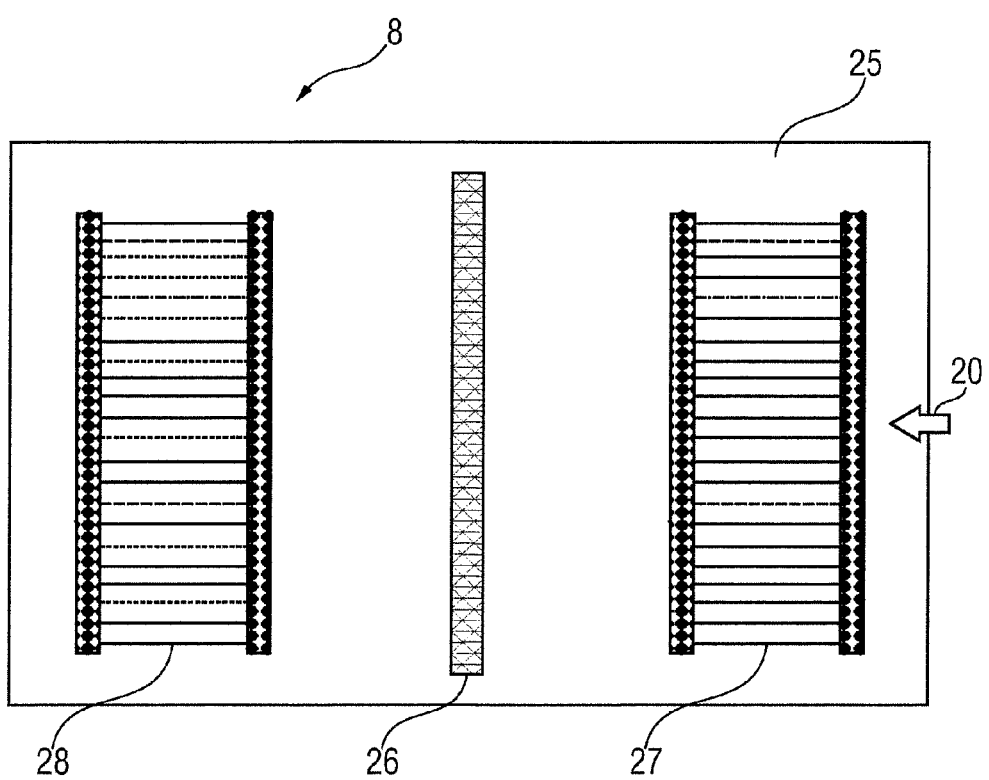
FIG. 2 shows a further example of a mass flow sensor.

A further example of a mass flow sensor 8 that operates on the basis of the thermal (calorimetric) principle is illustrated in FIG. 2. A heating element 26, preferably an electrical resistance heating element, is applied to a substrate element 25, which may be, for example, composed of silicon nitrate (glass). A first temperature measurement element 27 and a second temperature measurement element 28 are arranged on the substrate element 25 upstream and downstream of the heating element 26, in the direction of the air flow 20. The first and the second temperature measurement element 27, 28 may be in the form of thermopiles.

A method according to the invention for monitoring a fuel tank system can be performed with the fuel tank system illustrated in FIG. 1. In the method according to the invention, the second valve 13 is firstly closed, and a positive pressure relative to the ambient pressure is then built up throughout the fuel tank system with the aid of the air pump 7 by fresh air 20 being pumped into the first line 6, the storage element 5, the tank 4 and the second line 12 when the first valve 9 is open. The positive pressure can be approximately 50 hectopascals (hPa). In the event of a large leakage in the fuel tank system, which can be caused, for example, by a fuel tank cap 18 not being closed, the air pump 7 will deliver a very large quantity of fresh air into the fuel tank system, which is immediately recognized by the mass flow sensor 8, after which corresponding information can be stored in the control device 21 and corresponding countermeasures can be initiated. More frequently, however, there are very small leakages in the fuel tank system that also have to be reliably identified. For this purpose, the procedure is as follows: when the first valve 9 is open and the second valve 13 is closed, the air pump 7 generates a positive pressure in relation to the ambient pressure in the fuel tank system. When a stable positive pressure of approximately, for example, 50 hPa in relation to the ambient pressure is reached, the first valve 9 is closed. The first valve 9 remains closed for a certain predetermined time, as a result of which no further fresh air can be delivered into the fuel tank system by the air pump 7. If a leakage is then present in the fuel tank system, which is hermetically closed by the first valve 9 and the second valve 13, the pressure in the fuel tank system will slowly drop over time. This drop in pressure could be detected by pressure sensors 15. However, it is provided according to an embodiment of the invention to detect the drop in pressure by the control device 21 adjusting the air pump to a rotational speed at which the previously adjusted positive pressure would be maintained by the air pump 7, whereupon the first valve 9 is opened again. If a drop in pressure over the time in which the first valve 9 was closed has then occurred in the fuel tank system because of a small leakage, when the first valve 9 is opened, a clearly measurable air mass flow will arise that can be detected by the mass flow sensor 8, and therefore a small leakage can be identified in the fuel tank system without a pressure sensor having to be used. According to the invention, it is even conceivable for the entire procedure described here to be able to be carried out without pressure sensors 15 and even without a mass flow sensor 8. For this purpose, the second valve 13 in the second line 12 is again closed and a positive pressure of, for example, 50 hectopascals (hPa) is built up in the fuel tank system with the air pump 7. In order to build up this positive pressure of, for example, 50 hectopascals (hPa) in relation to the ambient pressure, the air pump requires a precisely defined power, which can be determined by the control device 21 with reference to the absorbed current and the corresponding voltage. If the first valve 9 is then closed after a predetermined positive pressure is reached, the air pump 7 can continue to operate with a constant power consumption counter to the pressure prevailing in the fuel tank system. Should the fuel tank system lose pressure because of a small leakage over the time in which the first valve 9 is closed, this will be clearly apparent by way of the changed power consumption of the air pump 7 when the first valve 9 is opened again since the air pump 7 then has to redeliver fresh air 20 to the fuel tank system via the first line 6. The power consumption of the air pump 7 will therefore increase significantly in the event of the presence of a small leakage after the first valve is opened, which can be recorded by the control device 21.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for monitoring a fuel tank system having: a fuel tank (4) configured to store a fuel; a storage element (5) configured to temporarily store hydrocarbons, the fuel tank (4) and the storage element (5) being connected to each other such that hydrocarbons outgassed from the fuel stored in the fuel tank are stored in the storage element (5); a first line (6) connected to the storage element (5), through which first line (6) fresh air is deliverable to the storage element (5); a second line (12) connecting the storage element (5) to an intake line (16) and through which second line (12) fresh air enriched with hydrocarbons is deliverable from the storage element (5) to the intake line (16); a first valve (9) arranged in the first line (6) upstream of the storage element (5) in a direction of the fresh-air flow; an air pump (7) arranged between the first valve (9) and the storage element (5); a second valve (13) arranged in the second line (12) between the storage element (5) and the intake line (16); a temperature sensor (14) arranged in the first line (6) downstream of the air pump (7); a control device (21) arranged between the temperature sensor (14) and the storage element (5); and a mass flow sensor (8) arranged in the first line (6) between the first valve (9) and the storage element (5), the control device (21) being configured to control power consumption of the air pump (7) and to record leakage in the fuel tank system in an event of an increase in the power consumption of the air pump (7), the method comprising, in the following order:
   closing the second valve (13);
   generating a positive pressure relative to ambient pressure in the fuel tank system by the air pump (7);
   closing the first valve (9);
   monitoring a change in the positive pressure over time in the fuel tank system with reference to power consumption of the air pump;
   monitoring the sealing action of the fuel tank system with reference to the change in the positive pressure in the fuel tank system; and
   determining a leakage has occurred if the power consumption of the air pump increases.

2. The method as claimed in claim 1, wherein the change in the positive pressure in the fuel tank system is monitored with reference to the air mass flow in the first line, the air mass flow being determined with the mass flow sensor (8).

3. A fuel tank system comprising:
   a fuel tank (4) configured to store a fuel;
   a storage element (5) configured to temporarily store hydrocarbons, the fuel tank (4) and the storage element (5) being connected to each other such that hydrocarbons outgassed from the fuel stored in the fuel tank are stored in the storage element (5);
   a first line (6) connected to the storage element (5), through which first line (6) fresh air is deliverable to the storage element (5);
   a second line (12) connecting the storage element (5) to an intake line (16) and through which second line (12) fresh air enriched with hydrocarbons is deliverable from the storage element (5) to the intake line (16);
   a first valve (9) arranged in the first line (6) upstream of the storage element (5) in a direction of the fresh-air flow;
   an air pump (7) arranged between the first valve (9) and the storage element (5);
   a second valve (13) arranged in the second line (12) between the storage element (5) and the intake line (16);

a temperature sensor (14) arranged in the first line (6) downstream of the air pump (7);

a control device (21) arranged between the temperature sensor (14) and the storage element (5); and a mass flow sensor (8) arranged in the first line (6) between the first valve (9) and the storage element (5), wherein the control device (21) is configured to control power consumption of the air pump (7) and to determine whether a leakage has occurred in the fuel tank system based on detection of an increase in the power consumption of the air pump (7).

4. The fuel tank system as claimed in claim 3, wherein the air pump is a radial pump.

5. The fuel tank system as claimed in claim 3, further comprising a pressure sensor (15) arranged in the first line (6).

6. The fuel tank system as claimed in claim 3, wherein the mass flow sensor (8) operates based on the calorimetric principle.

7. The fuel tank system as claimed in claim 6, wherein the mass flow sensor (8) is integrated in the housing of the air pump (7).

\* \* \* \* \*